Patented Nov. 30, 1943

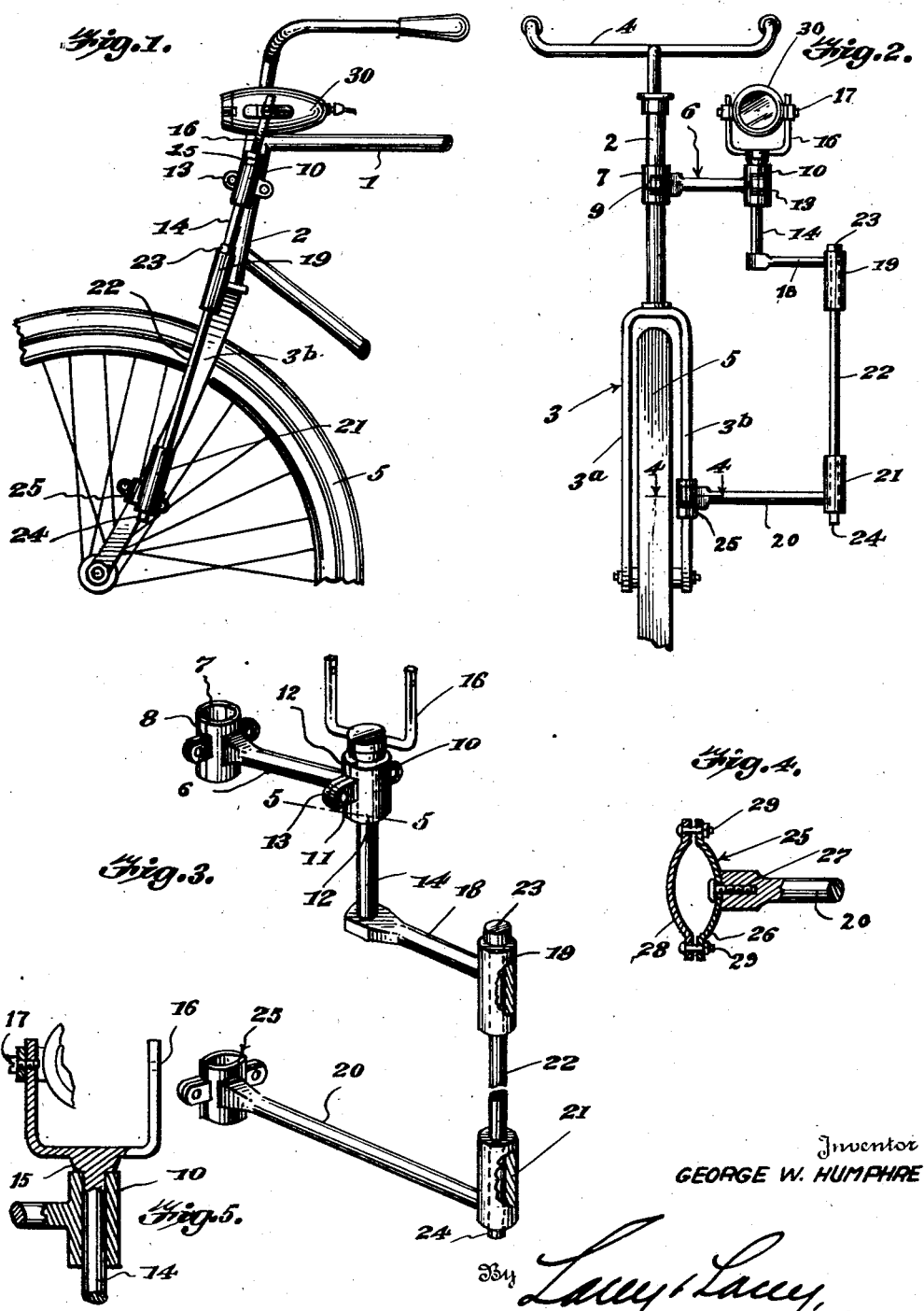

2,335,676

UNITED STATES PATENT OFFICE 2,335,676

LAMP MOUNTING

George W. Humphrey, Spring Valley, Ohio

Application March 5, 1942, Serial No. 433,499

1 Claim. (Cl. 240—7.55)

This invention relates generally to supports and more particularly to an improved lamp mounting for bicycles, motorcycles, and similar vehicles.

One object of the invention is to provide a lamp mounting which is so constructed that a lamp mounted thereon will be positioned at the proper height so that the rays projected therefrom, when the lamp is energized, will illuminate the maximum area in front of the vehicle.

Another object of the invention is to provide a lamp mounting which includes a bracket connected to one of the arms of the fork of the bicycle in such a manner that, when the fork is turned, the bracket will be shifted for swinging the lamp in the direction of the turn.

A further object of the invention is to provide a lamp mounting which may be easily attached to or removed from a bicycle or other similar vehicle.

Still further objects of the invention, not specifically mentioned hereinbefore, will become apparent during the course of the following description.

In the drawing:

Figure 1 is a side elevation showing my device mounted on a bicycle, the bicycle being shown fragmentarily, Figure 2 is a front elevation showing my improved lamp mounting in operative position on a bicycle, Figure 3 is an enlarged perspective view of the device, detached, Figure 4 is an enlarged detail horizontal sectional view on the line 4—4 of Figure 2, looking in the direction indicated by the arrows, and Figure 5 is an enlarged detail sectional view on the line 5—5 of Figure 3.

Throughout the views of the drawing similar reference numerals will be employed for designating like parts.

The numeral 1 indicates in general the frame of a bicycle. The frame 1 includes a head 2, and swingingly mounted in the head is the usual steering fork 3. Conventional handle bars 4 project through the head and are, of course, connected with the steering fork. As will be seen, the fork 3 includes parallel arms 3ª and 3ᵇ. Rotatably mounted between the arms 3ª and 3ᵇ is the front wheel 5 of the bicycle.

In carrying my invention into effect, I employ a supporting bracket 6 which is relatively short and which is formed of wood, metal, or other suitable material. The bracket 6 includes a split collar 7 at its inner end and said collar is normally engaged about the head 2 substantially medially of its height. The split collar 7 is formed with clamping ears 8 through which bolts 9 are normally extended for clamping the bracket in place. At its outer end the bracket 6 has mounted a bearing collar 10, said bearing collar having sections 11 and 12, said sections having cooperating clamping ears 13 which are similar to the ears 8.

Normally swingingly mounted in the bearing collar 10 is a stem 14. The stem 14 carries at its upper end an integral stop shoulder 15, and formed integrally on the stop shoulder 15 is a lamp supporting yoke 16, said yoke carrying clamping bolts 17 near the free ends of the arms thereof. As will be seen, the yoke 16 is of substantially U-shape. However, it should be understood that the shape of the yoke may be varied to suit particular conditions. In other words, should it be desired to mount an odd shaped lamp in the yoke, said yoke would be shaped to accommodate said lamp. The stop shoulder 15 will, as best seen in Figure 5, limit downward movement of the stem 14 so that the yoke will be prevented from being displaced downwardly. At its lower end the stem 14 carries a relatively short laterally extending lever 18, said lever carrying, at its free end, a vertically disposed bearing sleeve 19.

The numeral 20 indicates a relatively long lever which normally extends laterally and which carries, at its upper end, a vertically extending bearing sleeve 21. Operatively connecting the bearing sleeves with each other and freely rotatable in said bearing sleeves is a connecting rod 22, said rod having caps 23 and 24 at its upper and lower ends respectively for limiting the bearing sleeves 19 and 21 against displacement.

At its inner end, the relatively long lever 20 carries a split clamping collar 25, said collar being engageable about a portion of the arm 3ᵇ of the fork 3, near the lower end of said arm. As best seen in Figure 4, the collar 25 is substantially elliptical in shape and includes an inner section 26, which is secured to the end face of the lever 20 by a bolt 27, and an outer section 28, which is secured to the section 26 by clamping bolts 29.

It will now be seen that the rod 22 and the levers 18 and 20 cooperate to operatively connect the stem 14 with the arm 3ᵇ of the fork 3.

In use, after the device has been installed in the position shown in Figures 1 and 2 of the drawing, a lamp 30 is mounted in the yoke 16. In this connection, it should be understood that the lamp may be mounted in the yoke at any time either before or after installation of the device. As the bicycle is being ridden along a roadway in a forward direction, the beams of the lamp 30 will be projected forwardly for illuminating the road ahead of the bicycle. When it becomes necessary to negotiate a curve, the handle bars 4 are swung in the usual manner. When this is done, the lever 20 will be swung with the arm 3b of the fork 3. Swinging movement of the lever 20 will be communicated to the lever 18 through the rod 22 and, as said lever 18 is swung, the stem 14 will be rocked in the direction of swinging movement of the fork for swinging the lamp 30 in the direction of said swinging movement. Accordingly, the beams of the lamp will project in the direction of turning of the bicycle.

My invention is characterized by simplicity in construction and efficiency in use. The device may, as stated, be readily installed on or removed from the bicycle.

It is believed that further description of the invention is unnecessary.

Having thus described the invention, what is claimed as new is:

A lamp mounting including a horizontal supporting bracket having a collar at one end thereof and a bearing at the other end, means for securing the collar to a portion of the head of a bicycle frame, a vertical stem swingingly mounted in the bearing, a yoke on the stem above the bearing, said stem having a shoulder engaging the bearing for limiting downward movement of said stem, a lamp in the yoke, a relatively short horizontal lever connected with the stem and having a sleeve, a relatively long horizontal lever, means rigidly connecting the relatively long lever to a bicycle steering fork, said relatively long lever having its free end provided with a sleeve, and a vertical rod rotatably mounted in the sleeves and operatively connecting said sleeves, said levers and said rod cooperating for communicating swinging movement of the fork as it is swung during steering of the wheel for swinging said stem in the direction of swinging of the fork.

GEORGE W. HUMPHREY.